US011848935B2

United States Patent
Zadeh

(10) Patent No.: US 11,848,935 B2
(45) Date of Patent: *Dec. 19, 2023

(54) DYNAMICALLY GENERATING RESTRICTION PROFILES FOR MANAGED DEVICES

(71) Applicant: VMware, Inc., Palo Alto, CA (US)

(72) Inventor: Bahram Ali Zadeh, Duluth, GA (US)

(73) Assignee: VMware, Inc., New York, NY (US)

( * ) Notice: Subject to any disclaimer, the term of this patent is extended or adjusted under 35 U.S.C. 154(b) by 6 days.

This patent is subject to a terminal disclaimer.

(21) Appl. No.: 17/346,550

(22) Filed: Jun. 14, 2021

(65) Prior Publication Data

US 2021/0306342 A1   Sep. 30, 2021

Related U.S. Application Data

(63) Continuation of application No. 16/195,107, filed on Nov. 19, 2018, now Pat. No. 11,038,892.

(51) Int. Cl.
*H04L 9/40* (2022.01)
*G06F 8/71* (2018.01)
*G06Q 10/0635* (2023.01)
*G06F 21/62* (2013.01)
*G06F 21/57* (2013.01)
*H04W 12/37* (2021.01)

(52) U.S. Cl.
CPC .............. *H04L 63/102* (2013.01); *G06F 8/71* (2013.01); *G06F 21/577* (2013.01); *G06F 21/6218* (2013.01); *G06Q 10/0635* (2013.01); *H04L 63/105* (2013.01); *H04W 12/37* (2021.01); *H04L 63/104* (2013.01); *H04L 63/20* (2013.01)

(58) Field of Classification Search
CPC ..... H04L 63/10; H04L 63/102; H04L 63/105; H04L 63/101; H04L 63/104; H04L 63/20; G06F 8/71; G06F 8/61; G06F 8/65; G06F 8/70; G06F 21/577; G06F 21/6218
See application file for complete search history.

(56) References Cited

U.S. PATENT DOCUMENTS

| | | | |
|---|---|---|---|
| 10,715,507 B1 * | 7/2020 | Spears | G06Q 20/405 |
| 2017/0161049 A1 * | 6/2017 | Kim | H04L 41/0886 |
| 2018/0181387 A1 * | 6/2018 | Reynolds | G06F 8/65 |
| 2019/0215380 A1 * | 7/2019 | Rykowski | G06F 3/048 |
| 2019/0342296 A1 * | 11/2019 | Anandam | H04L 63/101 |
| 2020/0028879 A1 * | 1/2020 | Lahiri | H04W 12/08 |
| 2020/0125357 A1 * | 4/2020 | Shantharam | H04W 4/08 |
| 2023/0161604 A1 * | 5/2023 | Maloney | G06F 8/65 713/100 |

* cited by examiner

*Primary Examiner* — Shaqueal D Wade-Wright
(74) *Attorney, Agent, or Firm* — Thomas | Horstemeyer, LLP

(57) ABSTRACT

Disclosed are various examples for dynamically generating restriction profiles for updated software platforms. A management system can determine that updated restrictions and/or settings are included in an updated or new version of a definition file. The updated settings identified and categorized according to risk for a given enterprise group without administrator input. An updated restriction profile can be generated according to the updated settings and distributed to managed devices.

14 Claims, 5 Drawing Sheets

DYNAMICALLY GENERATING RESTRICTION PROFILES FOR MANAGED DEVICES

CROSS-REFERENCE TO RELATED APPLICATIONS

This application is a continuation of and claims the benefit of U.S. patent application Ser. No. 16/195,107, entitled "DYNAMICALLY GENERATING RESTRICTION PROFILES FOR MANAGED DEVICES," and filed Nov. 19, 2018, which is hereby incorporated by reference in its entirety.

BACKGROUND

With the emergence of bring-your-own-device (BYOD) technology in the workplace, enterprises permit employees or other personnel to use their own devices for business purposes. This can include accessing enterprise data, such as email and corporate documents. However, prior to an employee using his or her own device in the workplace, a company can require the employee to enroll with a management service capable of protecting enterprise data from theft, loss, and unauthorized access. Administrators can utilize the management service to oversee operation of the devices enrolled with or otherwise managed by the service.

Typically, devices such as laptops, tablets, and mobile phones are required to abide by the enterprise policies. In these environments, administrators are tasked with setting and enforcing security policies on the managed devices based on the capabilities of the different devices. As devices enrolled with the management service have operating systems and applications installed thereon, capabilities of the operating systems and applications are constantly being changed when patches, security fixes, upgrades, and other updates are made available and installed on the devices. As a result to the constant changes, configurations of the enrolled devices can be inconsistent with the capabilities of software platforms of the enrolled devices potentially subjecting the enrolled devices, as well as enterprise data accessible thereon, to numerous security vulnerabilities, such as theft, loss, and unauthorized access.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 2A and 2B are drawings illustrating functionality implemented by components of the networked environment and rendered on the client device.

DETAILED DESCRIPTION

Figure 1:
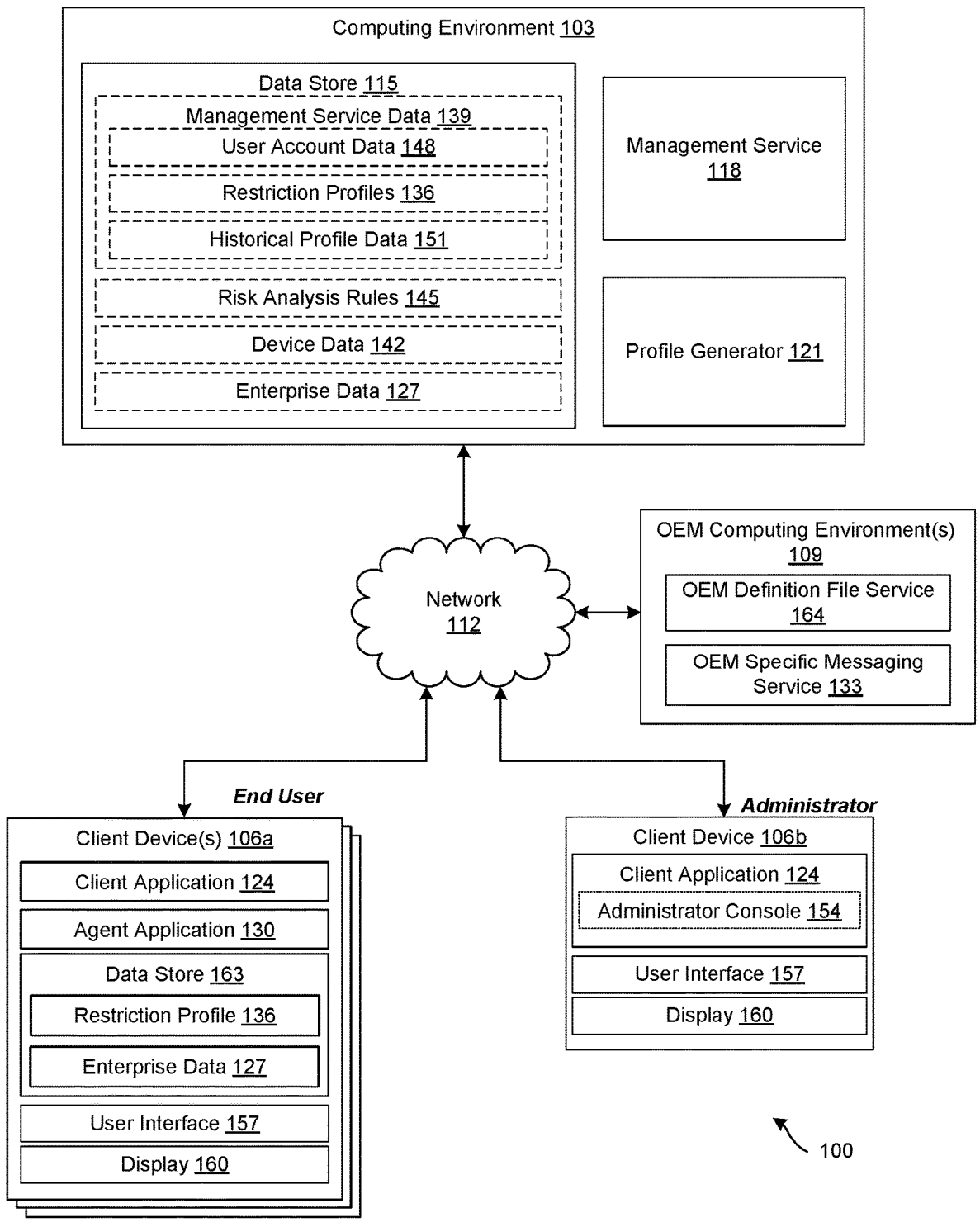
FIG. 1 is a drawing of an example of a networked environment, including a management system, an OEM computing environment and a client device.

The present disclosure relates to dynamically generating restriction profiles for user devices within an enterprise. A restriction profile defines the restrictions and settings that control what applications, hardware, and functionality an end user can access in order to protect enterprise data. Oftentimes, developers of operating systems and applications generate various versions of their software products to provide new or updated features, restrictions, and/or settings. Using various factors including, but not limited to, historical configuration settings, machine-learning models, enterprise domain type (e.g., banking, education, etc.), user role within the enterprise, device data, and/or other factors, the management system of the present disclosure can evaluate a risk level associated with the restriction settings with respect to protecting the enterprise data. Based on the risk assessment, the management system can automatically generate restriction profiles that provide restriction settings that are appropriate and risk averse for a given device and/or enterprise without the need for administrator intervention.

In an enterprise management environment, a management system enforces security policies of the enterprise on user devices, such as smartphones, tablets, laptops, and other suitable devices. The policies can include, for example, restrictions or permissions pertaining to capabilities of a device such that access to enterprise data is secured on the device. For instance, an enterprise or other organization can manage BYOD devices of contractors, employees, clients, customers, or other personnel to protect data from theft, loss, and unauthorized access. However, different types of devices can have one or more of a multitude of operating systems and applications installed thereon. For example, devices can have either the Microsoft Windows®, Apple iOS®, Android®, Ubuntu® Linux, or other operating system installed thereon. Each time one of the different software platforms is updated with a new release, the configurations of the enrolled devices can be inconsistent with the capabilities of the updated software platforms potentially subjecting enrolled devices, as well as enterprise data accessible thereon, to numerous security vulnerabilities.

In typical enterprise management environments, once an update or new release occurs, administrators use an administrator console to specify configurations for a device, resources to be loaded on or made accessible to a device, as well as other information. To generate a restriction profile, the administrator can specify a platform, such as Apple iOS®, and create a restriction profile for devices having the platform installed thereon using hard coded fields in a user interface that identifies the restrictions and corresponding setting options. Once an administrator reviews the different restrictions and/or settings options and selects a setting for the different restrictions, the restriction profile for the given platform and/or device is generated and made accessible to the device.

This process can be timely and requires the administrator to have a full understanding of how the different restrictions and/or setting options affect a given enterprise or organization. However, administrators are not always knowledgeable as to what the appropriate restriction settings should be for a particular device in a given enterprise and can allow access to features and or functions that can pose a security risk and/or can deny features and/or functions that would otherwise be useful. Accordingly, it can be beneficial to automatically generate restriction profiles accessible to client devices that provide settings that are appropriate and limit risk for a given device and/or enterprise without the need for administrator intervention.

According to various implementations, a management system can identify an updated definition file associated with a software platform. For example, an original equipment manufacturer (OEM) can provide information with a release of a new or updated platform that details the features and/or settings associated with the update. In some examples, the information can be automatically pushed to the management system. In other examples, the OEM publishes information that can be accessed by the management system. The OEM release can include a definition file that defines the added, removed, and/or updated restrictions and settings for a particular feature and/or function with respect to the update.

The definition file can define, for example, permitted functions and restricted functions as well as other settings that are coalesced into a configuration profile. Permitted functions can include, for example, accessing enterprise data during certain hours of the day or when the device is at a particular location, such as the workplace. Permitted functions can also include, for example, accessing permitted applications, resources, hardware components such as a camera or Bluetooth® function, or similar functions. Restricted functions, on the other hand, can include, for example, restricting access to camera functions when a device is at a particular location, such as an area having confidential information. Additionally, restricted functions can further include, for example, preventing "save as" functionality, preventing an application from copying to a clipboard, restricting access to web content, restricting access to non-permitted applications, resources, hardware components, such as a camera or Bluetooth® function, or other similar functions.

According to various implementations, a risk level for the updated and/or new settings can be determined. For example, using various factors including, but not limited to, historical configuration settings, machine learning models, enterprise domain type (e.g., banking, education, etc.), user role within the enterprise, device data, and/or other factors, the management system can evaluate a level of risk associated with the updated or new features, restrictions, and/or settings. In some implementations, risk is categorized by high risk, medium risk, and low risk. In other implementations, risk is defined by an explicit numeric evaluation. For example, a value between "0" and "1" can represent a percentage of risk per item per option where "0" corresponds to no risk and "1" corresponds to absolute risk.

According to various implementations, each industry or enterprise domain can have different levels of risk associated with different settings. For example, a setting for permitting a "copy in clipboard" function can be considered high risk for a banking enterprise and low risk for an education enterprise. In addition, for each industry, ranges for the different levels of risk can vary. For example, any setting having a risk level rate greater than "0.3" can be considered high risk in one enterprise domain and low or medium risk in another domain.

Upon categorizing the different restriction settings according to risk, the management system generates a restriction profile based on industry type, enterprise size, and/or risk level. The management system can then cause the restriction profiles to be distributed to the different managed devices.

In some implementations, an administrator can modify the generated restriction profiles using an administrator console. For example, if a particular restriction setting limits end-user capability to access data and/or use functions that are required and/or helpful for their role within an enterprise, the administrator can modify one or more settings in the restriction profile. According to some implementations, the administrator can review the different restriction settings for the different levels of risk. For example, the administrator through the administrator console can review the restriction settings when the restriction level for a device, user group, or organization is high risk, medium risk, and low risk.

In some implementations, the management system automatically generates restriction profiles based on a subscription setting. For example, managed devices can opt-in to a subscription service to receive the updated restriction profiles in lieu of having an administrator create the restriction profiles. In some implementations, an organization can request to only have the management system automatically generate restriction profiles for only a subset of settings.

In some implementations, the restriction profiles can be updated and/or modified without an update to the software platform. For example, in some implementations, the management system monitors the restriction profiles of managed devices. Using machine learning to evaluate changes to and/or feedback received with respect to the generated restriction profiles, the management system can update and/or modify the restriction profiles. For example, if a feature has been disabled on devices within different enterprises having the same domain, and feedback is received or administers have enabled the setting, the management system can update the restriction profiles to modify the setting.

With reference to FIG. 1, shown is an example of a networked environment 100. The networked environment 100 can include a computing environment 103, client devices 106a . . . 106b (collectively "client devices 106"), and a device OEM computing environment 109 in communication with one another over a network 112. The network 112 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 can include, for example, a server computer or any other system providing computing capability. Alternatively, the computing environment 103 can include a plurality of computing devices that are arranged, for example, in one or more server banks, computer banks, or other arrangements. The computing environments 103 can include a grid computing resource or any other distributed computing arrangement. The computing devices can be located in a single installation or can be distributed among many different geographical locations. The computing environments 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed. As the computing environment 103 communicates with the client devices 106 remotely over the network 112, the computing environment 103 can be described as a "remote" or "cloud" computing environment 103.

The computing environment 103 can include a data store 115. The data store 115 can include memory of the computing environment 103, mass storage resources of the computing environment 103, or any other storage resources on which data can be stored by the computing environment 103. The data stored in the data store 115, for example, can be associated with the operation of the various applications or functional entities described below.

The components executed on the computing environment 103 can include, for example, a management service 118, a profile generator 121, as well as other applications, services, processes, systems, engines, or functionality not discussed in detail herein. The management service 118 can be executed to oversee the operation of client devices 106 enrolled (or to be enrolled) with the management service 118. In some implementations, an enterprise, such as one or more companies or other organizations, can operate the management service 118 to oversee or manage the operation of the client devices 106 of its employees, contractors, customers, or other users having user accounts with the management service 118.

The management service 118 can cause various software components to be installed on a client device 106. Such software components can include, for example, client applications 124, resources, libraries, drivers, device configurations and profiles, or other similar components that require installation on the client device 106 as specified by an administrator of the management service 118. The management service 118 can further cause policies to be implemented on a client device 106. Policies can include, for example, restrictions or permissions pertaining to capabilities of a client device 106 such that access to enterprise data 127 is secured on the client device 106.

The management service 118 can interact with one or more client applications 124 executed on the client device 106 to perform management functions. In one example, the management service 118 interacts with an agent application 130 on a client device 106 associated with an end user to enroll the client device 106 with the management service 118. When enrolled, the agent application 130 can be registered as a device administrator of the client device 106, which can provide the agent application 130 with sufficient privileges to control the operation of the client device 106. In one example, the agent application 130 can be registered as the device administrator through the installation of a management profile at the operating system of the client device 106 that causes the operating system to designate the agent application 130 as the device administrator.

The management service 118 can direct the agent application 130 to perform device management functions on the client device 106. For example, the management service 118 can direct the agent application 130 to control access to certain software or hardware functions available on the client device 106. As a result, the management service 118 can verify that the configuration and operation of the client device 106 is in conformance with predefined criteria that ensures that enterprise data 127, or other data, is protected from data loss, unauthorized access, or other harmful events.

The management service 118 can further provision enterprise data 127 to the client device 106 through the agent application 130. In one example, the management service 118 can cause the agent application 130 to control use of the client device 106 or provision enterprise data to the client device 106 through use of a command queue provided by the management service 118. In some examples, the management service 118 can store commands in a command queue associated with a particular client device 106 and accessible by the particular client device 106. In some examples, the management service 118 can transmit an instruction to an original equipment manufacturer (OEM) messaging service 133 specific to the client devices 106 (e.g., ANDROID CLOUD MESSAGING SERVICE™ for ANDROID client devices) to cause the OEM specific messaging service 133 to send an instruction to the operating systems of the client devices 106, which causes the client devices 106 to retrieve commands from the command queues provided by the management service 118. In other examples, the agent application 130 is executed by such client device 106 to retrieve the contents of the command queue. In one example, the agent application 130 can retrieve the contents of the command queue on a configured interval, such as every four hours, or upon detection of a certain event, such as detection of an unauthorized application being executed by the client device 106. The management service 118 can also push commands to the agent application 130.

In any case, the agent application 130 can receive the contents of the command queue from the management service 118. In one example, the contents of the command queue can include a restriction profile 136 generated by the profile generator 121 and/or management service 118. In another application, the command queue can include a command that the agent application 130 should cause to be executed on the client device 106. In another example, the contents of the command queue can include a resource or other client application 124 that the agent application 130 should cause to be installed on the client device 106, which the client device 106 can access through a specified uniform resource locator (URL).

The profile generator 121 generates restriction profiles 136 that define the restrictions and settings of the client devices 106 enrolled (or to be enrolled) with the management service 118. The profile generator 121 can identify the updated settings provided in a platform release and determine a risk level for the setting for a given enterprise. The profile generator 121 can further generate the restriction profiles 136 according to the different levels of risk. In some implementations, the profile generator 121 can monitor the restriction profiles 136 for various managed devices across various organizations or enterprises and modify the restriction profiles 136 accordingly based on the monitored data. In some examples, the profile generator 121 is implemented as part of the management service 118. In other implementations, the profile generator 121 can run independently from the management service 118.

The data stored in the data store 115 can include, for example, management service data 139, device data 142, enterprise data 127, risk analysis rules 145, as well as other data. The management service data 139 can include, for example, user account data 148, restriction profiles 136, historical restriction profile data 151 as well as other data. The user account data 148 can include information pertaining to end users of the client devices 106 enrolled with the management service 118. For instance, the user account data 148 can include data used to authenticate an end user, such as a username, password, email address, biometric data, device identifier, registry identifier, or other data. Additionally, the user account data 148 can include other information associated with an end user, such as name, organization unit, or other information.

Restriction profiles 136 include restriction settings defined by the profile generator 121 according to a risk level and industry domain. In particular, the restriction profiles 136 define the restrictions and settings of the client devices 106 enrolled (or to be enrolled) with the management service 118. The restriction profiles 136 can vary based on industry type, device platform, user data associated with the device (e.g., role of user within company), restriction risk levels, and/or other factors. For example, the restriction profile 136 for devices in a banking industry will differ from the restriction profile 136 for devices in an education industry. In another example, the restriction profile 136 for a high-risk restriction level can include different restriction settings than a restriction profile 136 for a low-risk restriction level. The restriction level associated for a particular device 106 can be based on industry domain type, user role in the enterprise, administrator selection, and/or other factor.

The agent application 130 can configure a client device 106 as specified by a restriction profile 136. In some implementations, the restriction profiles 136 can be modified based on input provided by an administrator through an administrator console 155. For example, the administrator can customize one or more settings within the restriction profile 136. In other examples, the administrator can modify the restriction level associated with the settings. By changing the restriction level associated with the settings, the restriction profile 136 applied to a particular device 106 is modified (e.g., high risk vs. medium risk).

Configuration of a client device 106a for an end user can be performed by the agent application 130, as specified by a restriction profile 136 assigned to the client device 106a. For instance, through an administrator console 154, an administrator can create a restriction profile 136 for a client device 106, a group of client devices 106, or a user group. As can be appreciated, some client devices 106 can be configured differently than other client devices 106. In some examples, a restriction profile 136 can include an extensible markup language (XML) document, or other suitable type of file, that can be communicated to the client device 106 or otherwise accessed by the agent application 130.

The historical profile data 151 can include information about previously created restriction profiles for a collection of managed devices across various enterprise domains and software platforms. For example, the historical profile data 151 can include information regarding past settings for enforcing enterprise security by administers of different enterprises and/or enterprise domains. The historical profile data 151 can be used by the profile generator 121 to evaluate risk of a particular setting. For example, if the collective data from managed devices from different enterprises of the same and/or similar domain indicates that a particular restriction is typically disabled, the profile generator 121 can determine that the setting and/or similar setting is high risk.

The risk analysis rules 145 can include rules, models, and/or configuration data for the various algorithms or approaches employed by the profile generator 121 and/or management service 118 in analyzing the risk of any updated and/or new settings and generating the restriction profiles 136 based on the risk levels and enterprise domain. For example, the risk analysis rules 145 can include machine-learning models used to determine the risk of a setting based on historical data. In another example, the risk analysis rules 145 can include weights that can be assigned to the various factors in determining a risk level for a particular setting for a given enterprise. The risk analysis rules 145 can further include data that defines the different threshold levels of each risk level for a given enterprise, device, or user group.

The device data 142 can include information about the client device 106. The device data 142 can include, for example, information specifying applications that are installed on the client device 106, configurations or settings that are applied to the client device 106, user accounts associated with the device 106, the physical location of the client device 106, the enterprise associated with the client device 106, the network to which the client device is connected, and/or other information associated with the client device 106. Enterprise data 127 can include email, corporate documents, social media, messages, enterprise applications, confidential documents, and other enterprise content or communications.

The client device 106 can be representative of one or more client devices 106. The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include an operating system configured to execute various client applications, such as the agent application 130 or other application. Some client applications 124 can access network content served up by the computing environment 103 or other servers, thereby rendering a user interface 157 on a display 160, such as a liquid crystal display (LCD), touch-screen display, or other type of display device. To this end, some client applications 124 can include a web browser or a dedicated application, and a user interface 157 can include a network page, an application screen, or other interface. Further, other client applications 124 can include device management applications, enterprise applications, social networking applications, word processors, spreadsheet applications, media viewing applications, or other applications.

The client device 106 can also include a data store 163. The data store 163 can include memory of the client devices 106 or any other storage resources on which data can be stored by the client device 106. The data store 163 can include restriction profiles 136 and enterprise data 127. The data store 163 can include other data associated with the client application 124, the operating system, and the agent application 130.

The device OEM computing environment 109 represents one or more computing devices that can be operated by an OEM of the client device 106. The OEM computing environment 109 can execute the OEM specific messaging service 133, the OEM definition file service 164, as well as other services. The OEM specific messaging service 133 or a platform specific message service can represent a specific delivery mechanism for transmitting the platform-specific device profiles to the client device 106. One non-limiting example of an OEM specific messaging service 133 can be Apple's Apple Push Notification service (APNs). In some examples, the OEM specific messaging service 133 can transmit an indication to the client device 106 that a platform-specific device profile (e.g., a restriction profile 136) is ready to be retrieved.

The OEM definition file service 164 can provide an OEM definition file for a new version of the OEM's platform. For example, a new version of an operating system platform my support new features, restrictions, and/or settings which can be identified in the OEM definition file. The OEM definition file service 164 can also release additional information regarding updates such as, for example, release documents (e.g., white paper), descriptions with the definition file, and/or other information. In some implementations, the OEM definition file service 164 can notify the management service 118 of the updated OEM definition file. In other implementations, the management service 118 can request access to the OEM definition file and/or corresponding information.

Next, a general description of the operation of the components of the networked environment 100 is provided. To begin, the management service 118 can determine a current definition file associated with a given platform. When an OEM releases a new and/or updated software platform, the OEM releases a definition file that defines permitted functions and restricted functions as well as other settings that are coalesced into a configuration profile. The OEM release can include a definition file that defines the added, removed, and/or updated restrictions and settings for a particular feature and/or function with respect to the update. The definition file can further provide information defining what the different restrictions and/or settings are as well as provide recommendations for the restriction settings.

In some implementations, the management service 118 can identify the current version of the definition file by polling the OEM computing environment 109, the OEM Definition file service 164, a definition file repository, and/or other source that would have access to the current definition file for a target platform. In some implementations, the management service 118 can receive a notification to request the current definition file. In some examples, the information can be automatically pushed to the computing environment 103. In other examples, the OEM publishes information that can be accessed by the computing environment 103.

The management service 118 can identify any new, updated, and/or removed settings. For example, the management service 118 can compare the current definition file with an applied definition file to determine if there is any new, updated, and/or removed settings. In some implementations, the management service 118 can compare version identifiers between the two definition files. In other implementations, the management service 118 can compare the different data within the definition files. The applied definition file refers to the latest version of the definition file known to the management services 118 and applied by the managed devices running the target platform. If the current definition file is the same as the applied definition file, no further action is required. However, if the current definition file differs from the applied definition file, the restriction profile 136 applied by the managed devices 106 can be obsolete which can subject the devices 106 to security vulnerabilities.

The management service 118 can also identify the new, updated, and/or removed settings changes according to information released by the OEM. For example, the OEM can release documents, and/or other types of information that specify the changes within the new version. In some implementations, the management services 118 and/or other applications in the computing environment 103 can analyze the release documents or other documentation using natural language and machine-learning algorithms to identify the settings in the current release. Typically, an administrator is required to review the release documents for a software platform release to identify and understand the changes. However, this process can take weeks for an administrator to review and enter into the system, which can delay the time for a restriction profile for a managed device to become up-to-date, subjecting the managed device and/or enterprise to potential security vulnerabilities.

The management service 118 can also determine characteristics about the restrictions and/or settings. For example, the management service 118 can extract keywords in the description of the restrictions and/or settings. The keywords can be compared with a predefined list of keywords that are categorized according to particular features and/or functions.

Once the new, added, and/or updated restrictions and/or settings are identified, the management service 118 can assign a risk level to each of the restrictions and/or settings for a target enterprise. For example, using various factors including, but not limited to, historical configuration settings, machine learning models, enterprise domain type (e.g., banking, education, etc.), user role within the enterprise, device data, and/or other factors, the management system can evaluate a level of risk associated with the updated or new features, restrictions, and/or settings. In some implementations, the management service 118 and/or profile generator 121 can generate a score based on a sum of weights assigned to each of the factors. For example, each factor can be assigned a particular weight of importance in determining risk of a setting for a given enterprise domain.

In some implementations, risk is categorized by high risk, medium risk, and low risk. These can be determined according to different risk thresholds defined in the risk analysis rules 145. For example, if a score for a particular setting meets or exceeds a high risk threshold, the particular setting can be classified as high risk. In other implementations, risk can defined by an explicit numeric evaluation. For example, a value between "0" and "1" can represent a percentage of risk per item per option where "0" corresponds to no risk and "1" corresponds to absolute risk. In some implementations, the score can be calculated such that it is between the ranges of the explicit numeric evaluation. In other implementations, the score can be compared to thresholds that define the numeric evaluations to determine the classification of the particular setting. In some examples, if a particular setting/restriction is unknown and there are no similar types of settings/restrictions to compare to, the setting/restriction can be categorized as high risk. As more information is determined about the setting/restriction (e.g., feedback from managed devices, news releases, etc.), the risk categorization can be modified.

Next, the profile generator 121 can generate a restriction profile 136 for the managed devices 106 using the software platform affected by the current definition file. The restriction profile 136 is generated to define the appropriate and risk averse settings with respect to the current definition file of the software platform. The restriction profile 136 can include the restriction settings according to risk level for a particular domain. For example, the restriction profile 136 for managed devices 106 in one enterprise domain type can define some settings as high risk that may not be defined as high risk in a restriction profile 136 for managed devices in another enterprise domain type.

Once the profile generator 121 creates the restriction profiles 136, the management service 118 can cause the restriction profiles 136 to be distributed to the client devices 106. For example, the management service 118 can store the restriction profiles 136 in a command queue associated with a particular client device 106 and accessible by the particular client device 106. In some examples, the management service 118 can transmit an instruction to the OEM messaging service 133 specific to the client devices 106 to cause the OEM specific messaging service 133 to send an instruction to the operating systems of the client devices 106, which causes the client devices 106 to retrieve the restriction profile 136 from the command queues provided by the management service 116. In other examples, the agent application of a client device 106 retrieves the contents of the command queue. In one example, the agent application 130 can retrieve the contents of the command queue on a configured interval, such as every four hours, or upon detection of a certain event, such as detection of an unauthorized application being executed by the client device 106.

The management service 118 can also push the restriction profile 136 to the agent application 130.

Figures 2A, 2B:
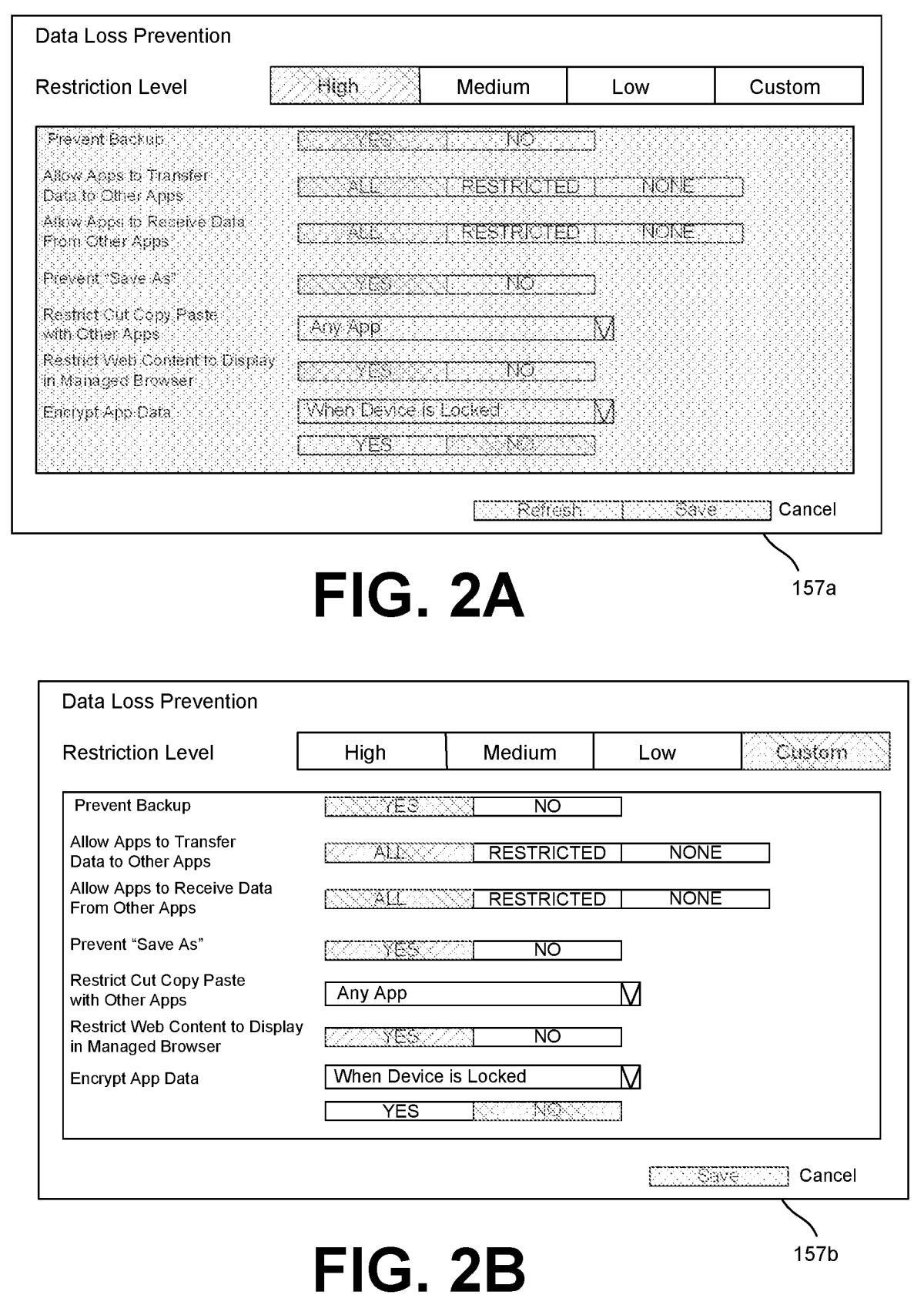

Referring next to FIGS. 2A and 2B, user interfaces 157*a*, 157*b* of an administrator console 154 are shown according to one or more examples. The administrator console 154 can be used by one or more administrators of the management service 118, for example, to oversee or manage client devices 106 enrolled with the management service 118. In the example of FIG. 2A, a user interface 157*a* is shown to facilitate review and management of restriction profiles 136 for various managed devices 106 according to risk level. The settings shown in the user interface 157*a* correspond to the settings of the restriction profile 136 automatically generated by the profile generator 121. The user interface 157*a* includes selectable components for selecting the different type of restriction level the administrator may wish to review. Selection of the High, Medium, or Low components disables the setting area so that the administrator cannot change the setting. However, the administrator can review in order to verify how the settings are currently processed. FIG. 2B corresponds to a user interface 157*b* where the administrator has selected the Custom component. Selection of the Custom component allows the administrator to choose the settings manually, thereby modifying the restriction profile 136 generated by the profile generator 121.

Figure 3:
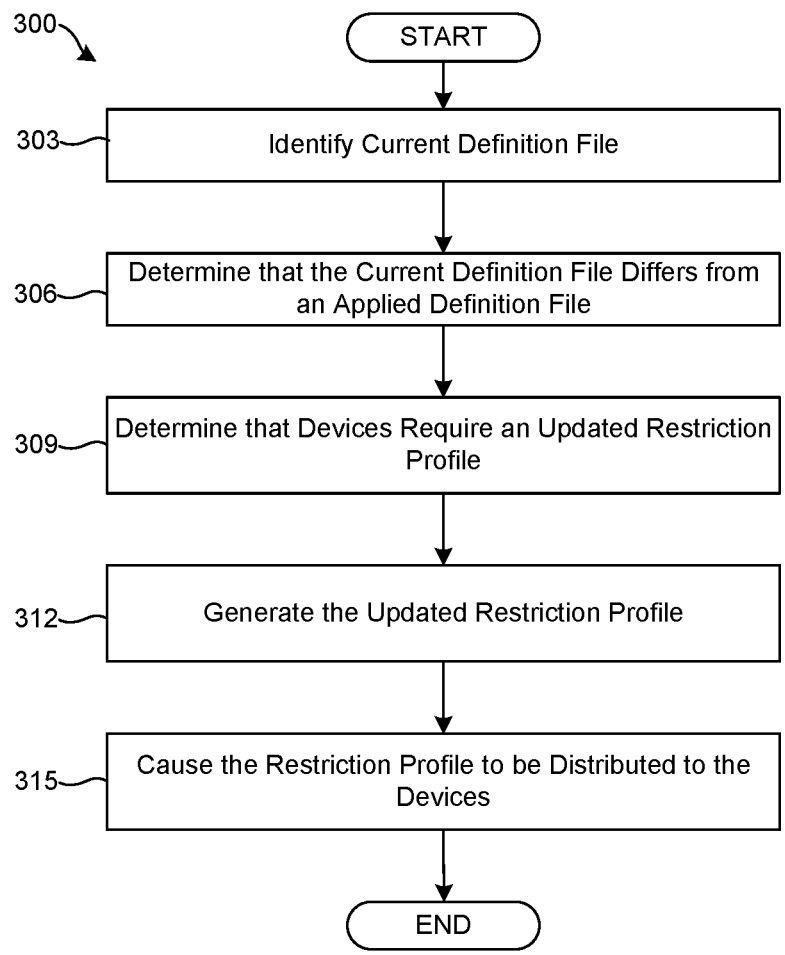
FIGS. 3-6 are example flowcharts illustrating functionality implemented by components of the networked environment.

Moving on to FIG. 3, shown is a flowchart that provides one example of the operation of a portion of the computing environment 103. The flowchart of FIG. 3 can be viewed as depicting an example of elements of a method implemented by the management service 118, the profile generator 121, or other suitable software component according to one or more examples. The separation or segmentation of functionality as discussed herein is presented for illustrative purposes only.

In step 303, the management service 118 identifies the current definition file for a given platform. The management service 118 can identify the current definition file by requesting a latest version of the current definition file from the OEM definition file service 164, the OEM computing environment 109, definition file repository, and/or other source with access to the current definition file.

In step 306, the management service 118 determines that the current definition file differs from an applied definition file. For example, the management service 118 can compare version identifiers, date of release, data fields within the definition files, and/or other information to determine differences between the definition files.

In step 309, the management service 118 determines that the managed devices 106 using the software platform require an updated restriction profile 136. For example, if there are new, updated, and/or removed settings identified in the comparison of the current definition file and the applied definition file, the management service 118 can determine that the managed devices 106 require an updated restriction profile 136 to avoid potential security vulnerabilities.

In step 312, management service 118 and/or the profile generator 121 generates an updated restriction profile 136 according to at least a risk level of the different settings and a type of enterprise domain associated with the managed devices 106.

In step 315, the management service 118 causes the updated restriction profile 136 to be distributed to the managed client devices 106. Thereafter, the process can proceed to completion.

Figure 4:
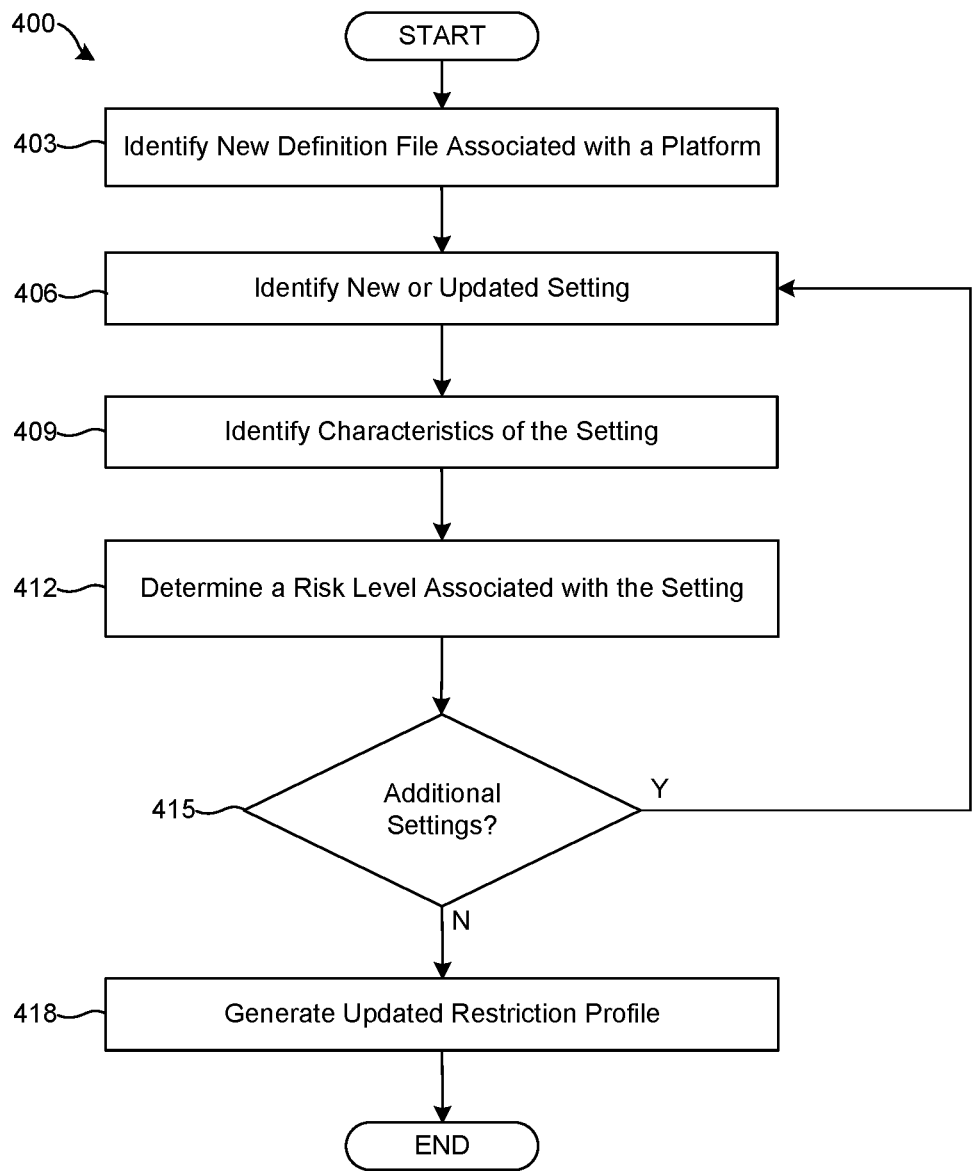

Moving on to FIG. 4, shown is a flowchart 400 that provides one example of the operation of a portion of the computing environment 103. The flowchart of FIG. 4 can be viewed as depicting an example of elements of a method implemented by the management service 118, the profile generator 121, or other suitable software component according to one or more examples. The separation or segmentation of functionality as discussed herein is presented for illustrative purposes only.

In step 403, the management service 118 identifies an updated definition file associated with a software platform. For example, the management service 118 can identify a new definition file with respect to receiving an indication of a release of an updated or new software platform. The indication can be received directly from the OEM, in response to a poll by the management service 118, a news release, and/or other source as can be appreciated.

In step 406, the management service 118 and/or the profile generator 121 identifies a new or updated restriction and/or setting within the updated definition file. In some examples, the new or updated restriction and/or setting is identified in response to an analysis of a white paper (or other release document) provided with a release of the updated or new software platform. In other examples, the new or updated restriction and/or setting is identified following a comparison of a prior definition file with the updated definition file.

In step 409, the management service 118 and/or the profile generator 121 identifies characteristics of the restriction setting. For example, the characteristics can include information regarding the data that can be accessed and/or modified if the setting for a particular restriction was enabled, disabled, or otherwise limited. According to various implementations, the management service 118 and/or the profile generator 121 can identify the characteristics according to similar known settings, analysis of setting descriptions, news release, release documents, and/or other type of information.

In step 412, the management service 118 and/or the profile generator 121 determines a risk level associated with the setting. For example, using various factors including, but not limited to, historical configuration settings, machine learning models, enterprise domain type (e.g., banking, education, etc.), user role within the enterprise, device data, and/or other factors, the management system can evaluate a level of risk associated with the updated or new setting. According to the analysis of factors, the management service 118 and/or the profile generator 121 determines the appropriate risk level for the setting.

In step 415, the management service 118 and/or the profile generator 121 determines if there are additional settings to be evaluated in the new definition file. If there are new settings, the management service 118 and/or profile generator 121 returns to step 406. Otherwise, the management service 118 and/or profile generator 121 proceeds to step 418.

In step 418, the profile generator 121 dynamically generates the restriction profile 136 without administrator intervention. For example, the profile generator 121 generates the restriction profile 136 for a given device according to the restriction levels of the settings in the current definition file. The restriction profiles 136 can vary based on the device 106, enterprise type, enterprise size, user groups, and/or other factors. Thereafter, the process can proceed to completion.

Figure 5:
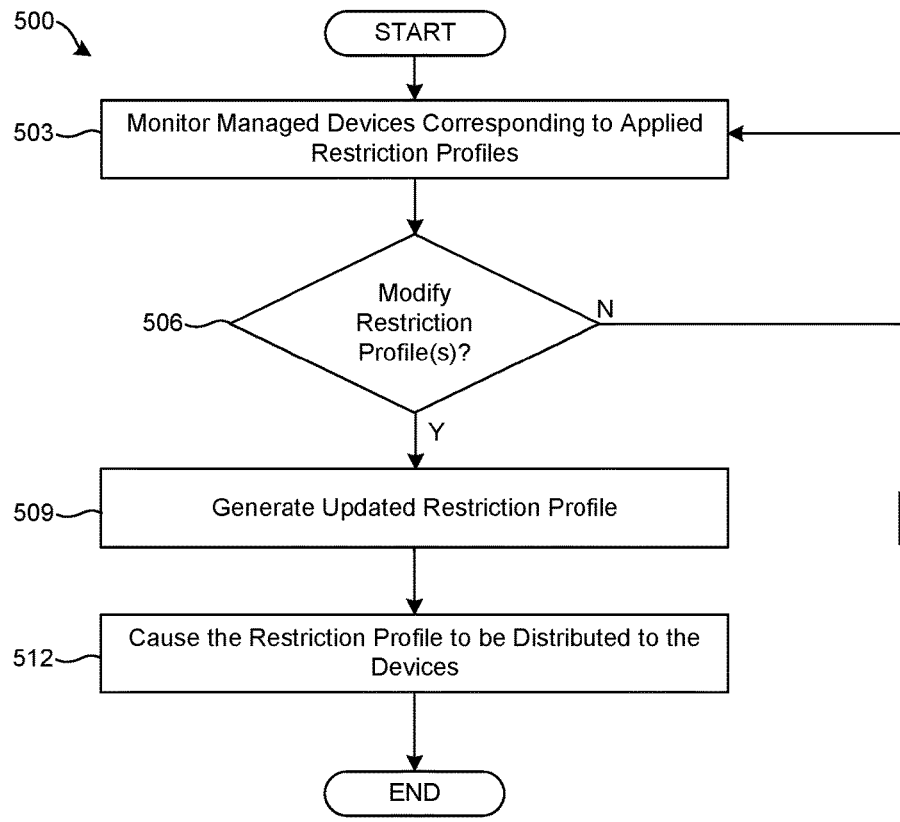

Moving on to FIG. 5, shown is a flowchart 500 that provides one example of the operation of a portion of the computing environment 103. The flowchart of FIG. 5 can be viewed as depicting an example of elements of a method implemented by the management service 118, the profile generator 121, or other suitable software component according to one or more examples. The separation or segmentation of functionality as discussed herein is presented for illustrative purposes only.

In step 503, the management service 118 can monitor the managed devices 106 corresponding to the applied restriction profiles 136. For example, the management service 118 can monitor the restriction profiles 136 to determine if there are any administrator changes made to the restriction profiles 136 of the managed devices. Further, the management service 118 can monitor user feedback received with respect to one or more settings of the restriction profile 136.

In step 506, the management service 118 determines whether to modify the restriction profile 136. For example, if the management service 118 determines that negative feedback regarding one or more of the settings is received from multiple users and/or administrators of the managed devices, the management service 118 can determine that the restriction profile 136 should be modified to change the restriction setting. In another example, the management service 118 can determine that one or more of the same settings have been modified by administrators of different enterprises or organizations. If the number of changes to the same setting exceeds a predefined threshold, the management service 118 can determine to modify the restriction profile 136. If the management service 118 determines to not modify the restriction profile 136, the management service 119 returns to step 503. Otherwise, the management service 118 proceeds to step 509.

In step 509, the profile generator 121 generates the updated restriction profile 136. For example, the profile generator 121 can generate the updated restriction profile 136 according to modified restriction levels of one or more of the settings based on user feedback, administrator modifications, and/or other data.

In step 512, the management service 118 causes the updated restriction profile 136 to be distributed to the managed client devices 106. Thereafter, the process can proceed to completion.

Figure 6:
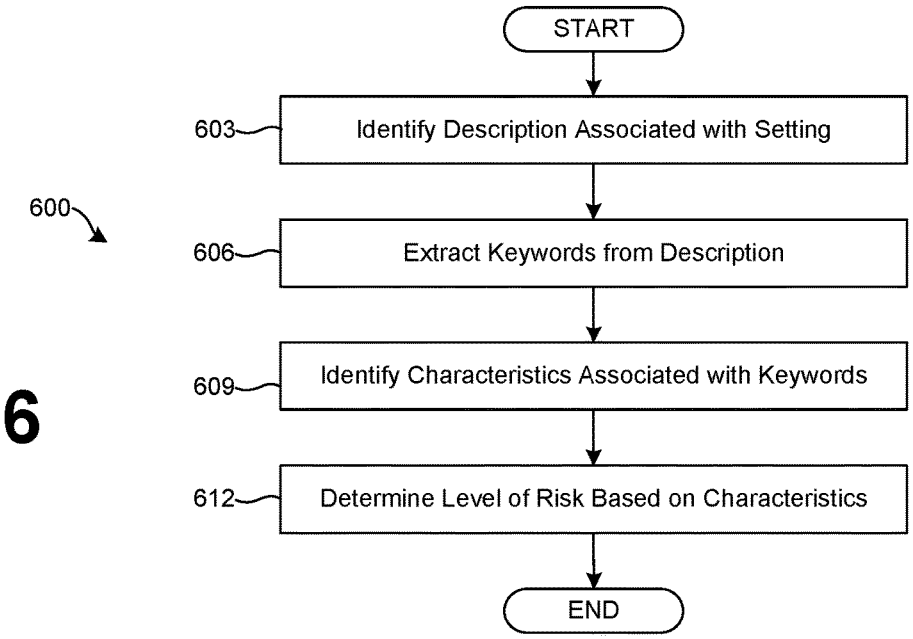

Moving on to FIG. 6, shown is a flowchart 600 that provides one example of the operation of a portion of the computing environment 103. The flowchart of FIG. 6 can be viewed as depicting an example of elements of a method implemented by the management service 118, the profile generator 121, or other suitable software component according to one or more examples. The separation or segmentation of functionality as discussed herein is presented for illustrative purposes only.

In step 603, the management service 118 or profile generator 121 can identify a description associated with a setting defined in a description file for a software platform. The description can correspond to a description of the setting in a release document, news release, field in the description file, and/or any other source.

In step 606, the management service 118 or profile generator 121 can extract one or more keywords from the description. For example, using a natural language analyzer, the management service 118, profile generator 121, or other suitable software component can extract keywords that can be useful in determining characteristics about the setting such as, for example, setting options, feature being affected by the setting, function affected by the setting, access being allowed, restricted, or limited based on the setting, and/or other information. For example, the setting can correspond to permitting or restriction a "copy to clipboard" feature. Keywords in the example setting description can include "copy" and "clipboard."

In step 609, the management service 118 or profile generator 121 can identify characteristics of the setting with respect to the keywords. For example, the keywords can be compared to a categorized list of keywords to identify one or more characteristics of the setting.

In step 612, the management service 118 or profile generator 121 can determine a level of risk for the setting based at least in part on the characteristics. For example, the characteristics can be used to determine similar and/or identical settings in other configurations which can be used as a factor in determining a level of risk. Further, the management service or profile generator 121 can refer to historical data to determine how similar and/or identical settings have been categorized in prior configurations. Thereafter, the process can proceed to completion.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape or other memory components.

Memory can include both volatile and nonvolatile memory and data storage components. Also, a processor can represent multiple processors or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the management service 118, profile generator 121, client applications 124, agent applications 130, and other various services and functions described can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A system for dynamically generating restriction profiles for an updated software platform, the system comprising:
   at least one computing device; and
   at least one application executable in the at least one computing device, wherein the at least one application, when executed, causes the at least one computing device to:
   identify a current version of a restriction definition file associated with the updated software platform;
   determine that the current version of the restriction definition file differs from an applied version of the restriction definition file by identifying an updated restriction setting in the current version of the restriction definition file;
   determine a risk level associated with the updated restriction setting for the enterprise group;
   determine that a plurality of client devices require an updated restriction profile of the restriction definition file based at least in part on a restriction setting level associated with an enterprise group corresponding to the plurality of client devices, the updated restriction profile specifying at least one limit on hardware capabilities accessible through the updated software platform; and
   cause the updated restriction profile to be distributed to the plurality of client devices.

2. The system of claim 1, wherein, when executed, the at least one application further causes the at least one computing device to at least generate the updated restriction profile according to the updated restriction setting, the risk level, and the setting restriction level of the enterprise group.

3. The system of claim 1, wherein, when executed, the at least one application further causes the at least one computing device to at least:
   receive feedback from at least a subset of the plurality of client devices with respect to a restriction setting of the updated restriction profile; and
   modify the updated restriction profile based at least in part on the feedback.

4. The system of claim 1, wherein, when executed the at least one application further causes the at least one computing device to at least receive information from an original equipment manufacturer (OEM) of the updated software platform, wherein determining that the plurality of client devices require the updated restriction profile of the restriction definition file is further based on the information received from the OEM.

5. The system of claim 1, wherein, when executed the at least one application further causes the at least one computing device to at least receive a request to subscribe to a service that automatically generates the updated restriction profile.

6. A computer-implemented method for dynamically generating restriction profiles for an updated software platform, the method comprising:
   identifying a current version of a restriction definition file associated with the updated software platform;
   determining that the current version of the restriction definition file differs from an applied version of the restriction definition file by identifying an updated restriction setting in the current version of the restriction definition file;
   determining a risk level associated with the updated restriction setting for the enterprise group;
   determining that a plurality of client devices require an updated restriction profile of the restriction definition file based at least in part on a restriction setting level associated with an enterprise group corresponding to the plurality of client devices, the updated restriction profile specifying at least one limit on hardware capabilities accessible through the updated software platform; and
   causing the updated restriction profile to be distributed to the plurality of client devices.

7. The computer-implemented method of claim 6, further comprising generating the updated restriction profile according to the updated restriction setting, the risk level, and the setting restriction level of the enterprise group.

8. The computer-implemented method of claim 6, further comprising:
receiving feedback from at least a subset of the plurality of client devices with respect to a restriction setting of the updated restriction profile; and
modifying the updated restriction profile based at least in part on the feedback.

9. The computer-implemented method of claim 6, further comprising:
receiving information from an original equipment manufacturer (OEM) of the updated software platform, and
wherein determining that the plurality of client devices require the updated restriction profile of the restriction definition file is further based on the information received from the OEM.

10. The computer-implemented method of claim 6, further comprising receiving a request to subscribe to a service that automatically generates the updated restriction profile.

11. A non-transitory computer-readable medium embodying executable instructions, which, when executed by a processor, cause at least one computing device to at least:
identify a current version of a restriction definition file associated with an updated software platform;
determine that the current version of the restriction definition file differs from an applied version of the restriction definition file by identifying an updated restriction setting in the current version of the restriction definition file;
determine a risk level associated with the updated restriction setting for the enterprise group;
determine that a plurality of client devices require an updated restriction profile of the restriction definition file based at least in part on a restriction setting level associated with an enterprise group corresponding to the plurality of client devices, the updated restriction profile specifying at least one limit on hardware capabilities accessible through the updated software platform; and
cause the updated restriction profile to be distributed to the plurality of client devices.

12. The non-transitory computer-readable medium of claim 11, wherein, when executed, the executable instructions further cause the at least one computing device to at least generate the updated restriction profile according to the updated restriction setting, the risk level, and the setting restriction level of the enterprise group.

13. The non-transitory computer-readable medium of claim 11, wherein, when executed, the executable instructions further cause the at least one computing device to at least:
receive feedback from at least a subset of the plurality of client devices with respect to a restriction setting of the updated restriction profile; and
modify the updated restriction profile based at least in part on the feedback.

14. The non-transitory computer-readable medium of claim 11, wherein when executed the executable instructions further cause the at least one computing device to at least receive information from an original equipment manufacturer (OEM) of the updated software platform, wherein determining that the plurality of client devices require the updated restriction profile of the restriction definition file is further based on the information received from the OEM.

* * * * *